United States Patent
Comfort et al.

(10) Patent No.: US 7,308,652 B2
(45) Date of Patent: Dec. 11, 2007

(54) ENTRY OF A PASSWORD THROUGH A TOUCH-SENSITIVE COMPUTER SCREEN

(75) Inventors: Dawn Ashley Comfort, Raleigh, NC (US); Robert John Schule, Cary, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 213 days.

(21) Appl. No.: 09/877,482

(22) Filed: Jun. 8, 2001

(65) Prior Publication Data

US 2002/0196274 A1    Dec. 26, 2002

(51) Int. Cl.
G06F 3/00      (2006.01)
G06F 9/00      (2006.01)
G06F 17/00     (2006.01)

(52) U.S. Cl. .................... 715/741; 715/702; 715/773

(58) Field of Classification Search ................ 345/169, 345/702, 741, 773; 382/187, 189, 314; 715/541; 341/22

See application file for complete search history.

(56) References Cited

U.S. PATENT DOCUMENTS

| | | | |
|---|---|---|---|
| 5,784,060 A | | 7/1998 | Bertram et al. ............. 345/840 |
| 5,801,941 A | | 9/1998 | Bertram ..................... 700/83 |
| 5,805,157 A | | 9/1998 | Bertram et al. ............. 345/773 |
| 5,818,451 A | | 10/1998 | Bertram et al. ............. 345/840 |
| 6,266,236 B1 | * | 7/2001 | Ku et al. ................... 361/681 |
| 6,483,445 B1 | * | 11/2002 | England .................... 341/22 |
| 6,661,920 B1 | * | 12/2003 | Skinner ..................... 382/187 |
| 7,036,086 B2 | * | 4/2006 | Cobbley et al. ............ 715/773 |
| 2002/0054120 A1 | * | 5/2002 | Kawano et al. ............ 345/773 |
| 2002/0065881 A1 | * | 5/2002 | Mansikkaniemi et al. .. 709/204 |
| 2005/0125320 A1 | * | 6/2005 | Boesen ...................... 705/34 |

FOREIGN PATENT DOCUMENTS

JP          62276617          12/1987

OTHER PUBLICATIONS

Cowart, Robert. Mastering Windows 95: The Windows 95 Bible. 1995. Sybex. pp. 343-346.*
Innovation Management Group, INC's "My-T-Touch" On-Screen Keyboard. Version 1.70 release date Mar. 17, 2001. pp. 1-7.*
Handling Screen Savers, published at http://msdn.microsoft.com/library/psdk/shellcc/shell/Scrnsave.htm on May 8, 2001.
ScreenSaverProc, published at http://msdn.microsoft.com/library/psdk/shellcc/shell/functions/ScreenSaverProc.htm on May 8, 2001.

* cited by examiner

*Primary Examiner*—Kristine Kincaid
*Assistant Examiner*—Boris Pesin
(74) *Attorney, Agent, or Firm*—Ron Davidge; Carlos Munoz-Bustamante

(57) ABSTRACT

A keyboard graphic is displayed on a touch-sensitive display screen of a computing system when it is determined that a password should be entered, so that the password can be entered by touching individual spaces within the keyboard graphic. The keyboard graphic may be thus displayed several times during the operation of the system, including following a predetermined period in which no user input is made to the computing system, under control of a subroutine operating as a screen saver subroutine.

4 Claims, 6 Drawing Sheets

ENTRY OF A PASSWORD THROUGH A TOUCH-SENSITIVE COMPUTER SCREEN

BACKGROUND OF THE INVENTION

1. Field of the Invention

This invention relates to providing a means within a computer system for receiving a user password and, more particularly, for providing a system-generated keyboard graphic through which a such a password is entered when it is needed.

2. Background Art

Passwords are often used to prevent surreptitious use of a personal computing system. Operation of such a system for number of different purposes may be prevented until a previously determined password has been supplied by the user. For example, during a system initialization process, before the operating system is booted, a power-on password may be required. Then, after providing the power-on password, and after an operating system, such as Windows 9x, Windows ME, or Windows 2000, is loaded, the user is required to provide an operating system password before proceeding. Then, if user inputs are not made to the system within a predetermined time period, a screen saver routine is started, requiring the user to input a screen saver password before continuing to use the computer.

Screen saver routines were originally developed to provide moving images to be displayed on the screen of a computer not being actively used, so that a static image could not be burned into the phosphorus coating of the cathode ray tube in a display of a computer which had been left on with the same image being displayed for an extended period of time. More recent improvements in the art of building computer displays have made this use of screen saver routines generally unnecessary, as a static image remaining on the screen for a long time is still not burned into the phosphorus.

Nevertheless, screen saver routines are very popular, being used to provide attractive images when a computer is not being actively used. Modern screen savers also provide a security function in the form of a password, which can optionally be set by the computer user to prevent, or at least discourage, unauthorized use of the computer and its stored data. For example, if a password function has been set in a conventional computing system, running a conventional operating system, such as Windows 9x or Windows 2000, and displaying a screen saver, a password must be entered by a potential system user before the operating system moves on to allow access to computer functions and data. Under these conditions, when a potential user provides an input to the system by depressing a key on the keyboard or by moving a pointing device, such as a mouse, the system displays an instruction to enter the password. The predetermined password is then entered by means of the keyboard.

After the password has been entered correctly, the operating system proceeds to display a screen from which the user can proceed to use the system. The nature of this screen typically depends on what was occurring before the screen saver routine was started. For example, the screen saver routine can be set to start when the system enters a suspense mode following a predetermined elapsed time without an input through the keyboard or pointing device. If the screen saver routine has been started in this way, the system returns to the program being executed before the suspense mode was entered. While alphanumeric data is generally entered into a computing system by the system user through the system keyboard, such data may also be entered using a touch-sensitive display. For example, Japanese Patent Application No, 62-276617 describes a touch-sensitive display screen having a thin, transparent overlay with a printed keybutton pattern attached to an outer screen surface, with the overlay being used to locate positions used as input keys in entering a password. What is needed is a keyboard or keypad graphic which is displayed only when it is needed, so that the entire display screen can be used for other purposes when this particular graphic is not needed.

Several patents describe a computer in which entry of data from an area provided on a display, touchscreen, or the like is facilitated by the provision of a "soft keyboard." For example, U.S. Pat. No. 5,784,060 describes such a computer, in which the data entry area is defined, by the cooperation of a control program and a processor, to have a central zone in which data entry keys are displayed, and peripheral zones, in which function keys and a list of entry options are displayed. A user can change the keyboard into any desired one of a variety of configurations. U.S. Pat. No. 5,805,157 describes such a computer having keys programmable as hexagonal cells, which enable the display of larger areas for engagement by the finger or other input pointer. The user is permitted a choice between hexagonal and rectangular cells. U.S. Pat. No. 5,818,451 describes such a computer in which misentry of data is avoided by providing for the adjustment of the input by raising the entry of input by providing for the adjustment of the input by a fixed percentage of the size of the target soft key. U.S. Pat. No. 5,801,941 describes such a computer in which misentry of data is avoided by providing for the calculation of an offset as may be required by the entry habits of a user which target areas of a defined key cell spaced from the center of the cell.

SUMMARY OF THE INVENTION

In accordance with a first aspect of the invention, a method for entry of a password is provided in a computer system having a user interface including a touch-sensitive display screen. The method includes determining that the password is required, and, in response to determining that it is required, displaying a keyboard graphic on the touch-sensitive display screen and providing for the conversion of output signals from the touch-sensitive display screen. The keyboard graphic includes a first number of spaces, each of which is defined by surrounding lines within the keyboard graphic, and each of which includes a symbol representing an alphanumeric character. The output signals are converted so that a signal caused by touching the touch-sensitive display screen in one of the first number of spaces produces a code representing the alphanumeric character within the space. The method preferably also includes sequentially receiving codes representing alphanumeric characters, determining that the characters represented by these codes form a predetermined password, and removing the keyboard graphic from the touch-sensitive screen.

The keyboard graphic may additionally include a second number of spaces, each of which includes a graphical representation of a function performed within the computer system. Further in response to determining that the password is required, the output signals are converted so that a signal caused by touching the touch-sensitive display screen in one of the second number of spaces produces a code representing the function represented by the graphical representation within the space.

In accordance with a second aspect of the invention, the method starts with receiving a user input to the computer system. Then, a timer is reset and started.

When a predetermined time has elapsed since starting the timer, it is determined whether a keyboard graphic is visible on the touch-sensitive display screen. Then, if the keyboard graphic is not visible, it is displayed on the screen. In either case, output signals from the touch-sensitive display screen are converted to produce a code representing an alphanumeric character representing a symbol included within the space as codes representing alphanumeric characters. After it is determined that the alphanumeric character represented by these codes form a predetermined password, if the keyboard graphic was not previously visible, it is removed from the screen.

In accordance with a third aspect of the invention, a computer system is provided, including a touch-sensitive display screen, information storage, and a processor. The touch-sensitive display screen has a display surface and generates output signals in response to the display surface being touched, with the output signal indicating a position in which the display surface is touched. The information storage stores an operating system and a soft keyboard subroutine. The operating system, executing within the processor, determines that a password is required and causes the soft keyboard subroutine to display a keyboard graphic on the touch-sensitive display screen and to cause a conversion of the output signals. The keyboard graphic includes a first number of spaces, each of which is defined by surrounding lines within the keyboard graphic, and each of which includes a symbol representing an alphanumeric character within the keyboard graphic. The conversion of the output signals causes signals generated in response to touching the touch-sensitive display screen within a space in the first plurality of spaces produces a code representing the alphanumeric character represented by the symbol included within the space.

DETAILED DESCRIPTION OF THE INVENTION

Figure 1:
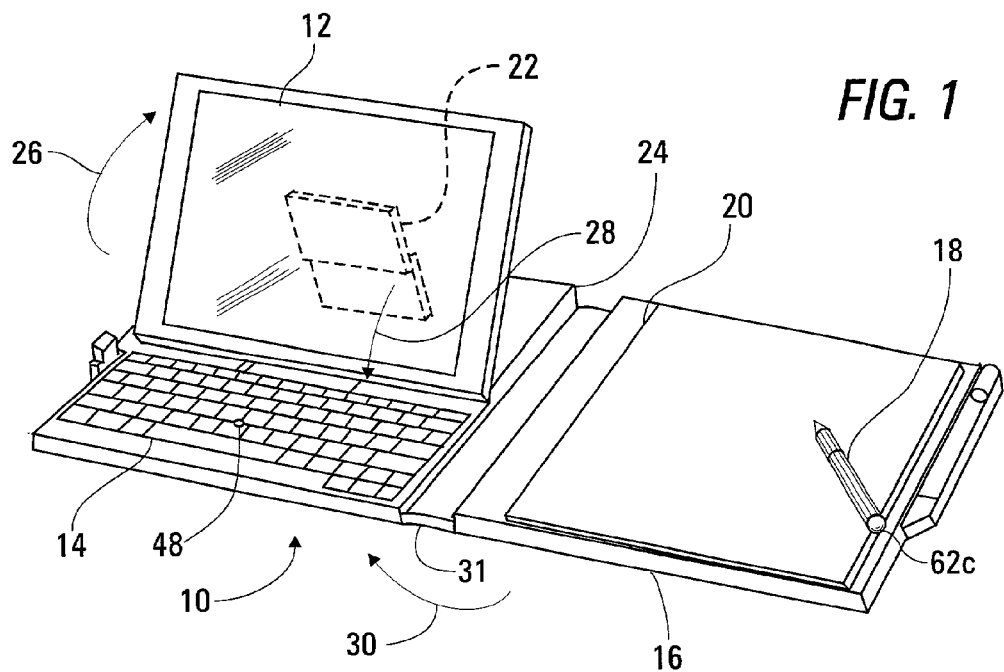
FIG. 1 is a perspective view of a computing system which operates in accordance with the present invention.

FIG. 1 is a perspective view of a computing system 10, sold as the IBM ThinkPad TransNote computer, including a touch sensitive display screen 12, a keyboard 14, and a digital notepad 16. Alphanumeric inputs to the computing system are provided through the use of the keyboard 14 and the touch sensitive display screen 12, with a soft keyboard being displayed on the display screen 12 to facilitate such inputs. Graphical inputs are also provided through the use of a special pen 18 by writing on a paper pad 20 placed atop the digital notepad 16.

In accordance with the present invention, the computing system 10 provides for the use of one or more passwords to prevent operation of the system under control of a user until the user has successfully entered a predetermined password. For example, a password may be required before finishing the process of booting the operating system and again after the system has apparently been left unattended for a predetermined time, as evidenced by a lack of operator inputs. While the user may supply a password required by the system 10 by typing it on the keyboard 14, the system 10 is often configured to make using the keyboard 14 inconvenient. With the keyboard in the raised position of FIG. 1, the keyboard 14 is exposed so that it can be easily used. However, the display screen 12 is pivotally mounted on a support bracket 22, which is itself pivotally mounted on the system housing 24. From the position of FIG. 1, the keyboard 14 may be pivoted in the direction of arrow 26 into a horizontal position, and the support bracket 22 may be lowered by pivoting in the direction of arrow 28 until the display screen 12 extends horizontally over the keyboard 14. The digital notepad 16 may also be rotated in the direction of arrow 30 to be folded under the system housing 24, as a flexible central section 31 is formed into a curved shape.

Figure 2:
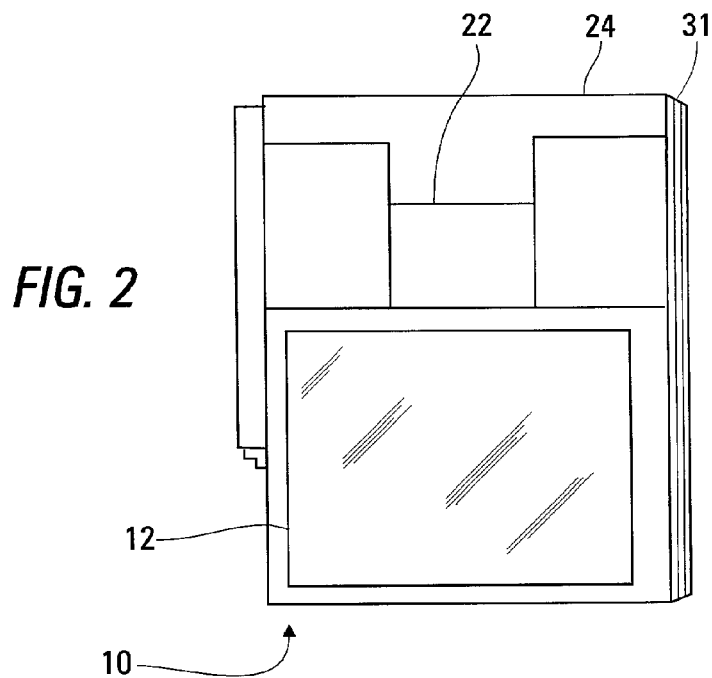
FIG. 2 is a plan view of the computing system of FIG. 1 in a fully folded configuration.

FIG. 2 is a plan view of the system 10 in this fully folded configuration, forming a small, flat, relatively thin package with only the touch-sensitive display screen 12 being upwardly exposed for user input. It is anticipated that the system 10 will often be used in this configuration, particularly in tight spaces, such as airplane seats, with user inputs being provided through the use of the touch-sensitive display or, with the system 10 inverted from the orientation of FIG. 2, through the digital note pad 16. Therefore, the present invention provides a method for inputting a password through the touch-sensitive display screen 12, eliminating a need to move the display screen 12 into a position exposing the keyboard 14.

Figure 3:
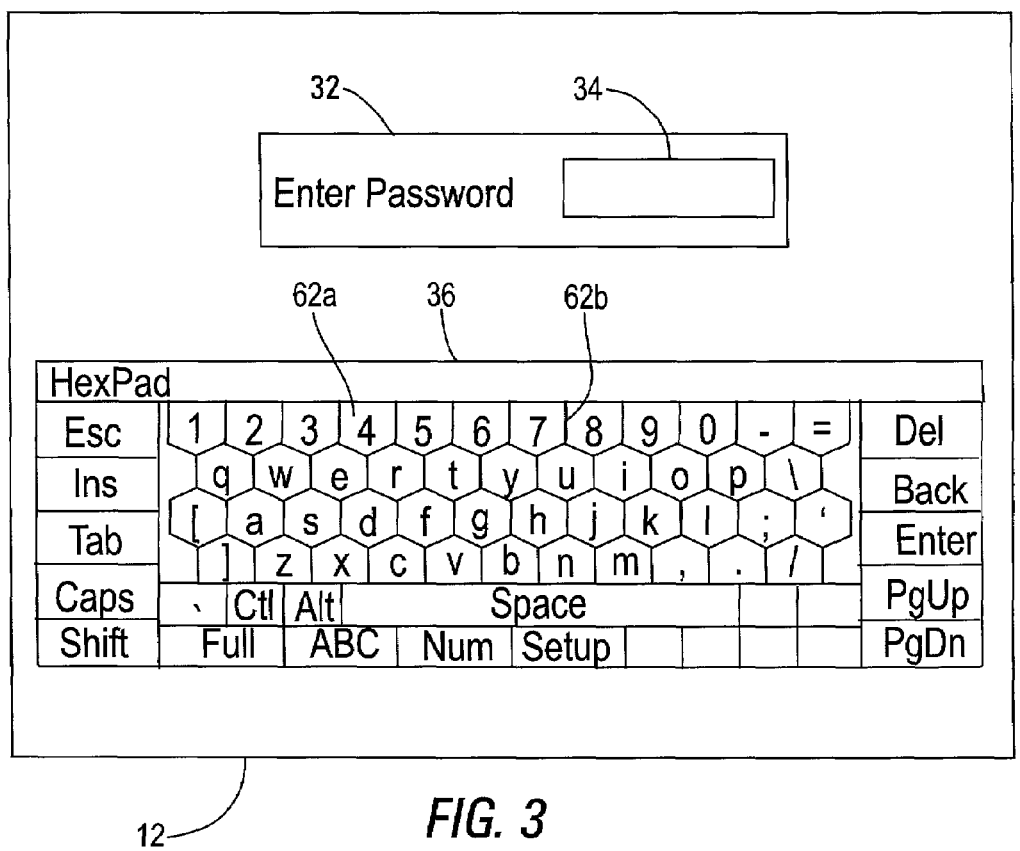
FIG. 3 is an illustration of a display screen of the computing system of FIG. 1 while driven by a routine executing within the computing system to require entry of a password.

FIG. 3 is an illustration of the display screen 12 of the computing system 10 when driven by a routine executing in the system 10 to require a password, with the a dialog box 32 indicating that a password is to be supplied and providing a text box 34 in which an additional asterisk (*) is displayed for each alphanumeric character entered within the password. This method of displaying data is chosen to provide a degree of feedback to the user inputting the data without revealing the password to someone else viewing the display. The dialog box 32 may also describe the type of password to be supplied, such as a log-on password or a screen saver password. The dialog box 32 is considered to be exemplary of a indication presented on the display screen 12 to indicate that a password is required.

A keyboard graphic 36 is also displayed, being associated with various areas of the display screen 12 being defined as pressure-sensitive for providing particular user inputs, for example in the manner generally described in U.S. Pat. Nos. 5,784,060, and 5,805,157 the disclosure of which is incorporated herein by reference. In this way, the user is preferably provided with an ability to choose between a keyboard configuration presenting hexagonally shaped key areas, as shown in FIG. 3, and a keyboard configuration presenting rectangularly shaped key areas. The methods described in U.S. Pat. Nos. 5,818,451 and 5,801,941, the disclosure of which is also incorporated herein by reference, may also be used to reduce the possibility that data may be entered incorrectly.

Figure 4:
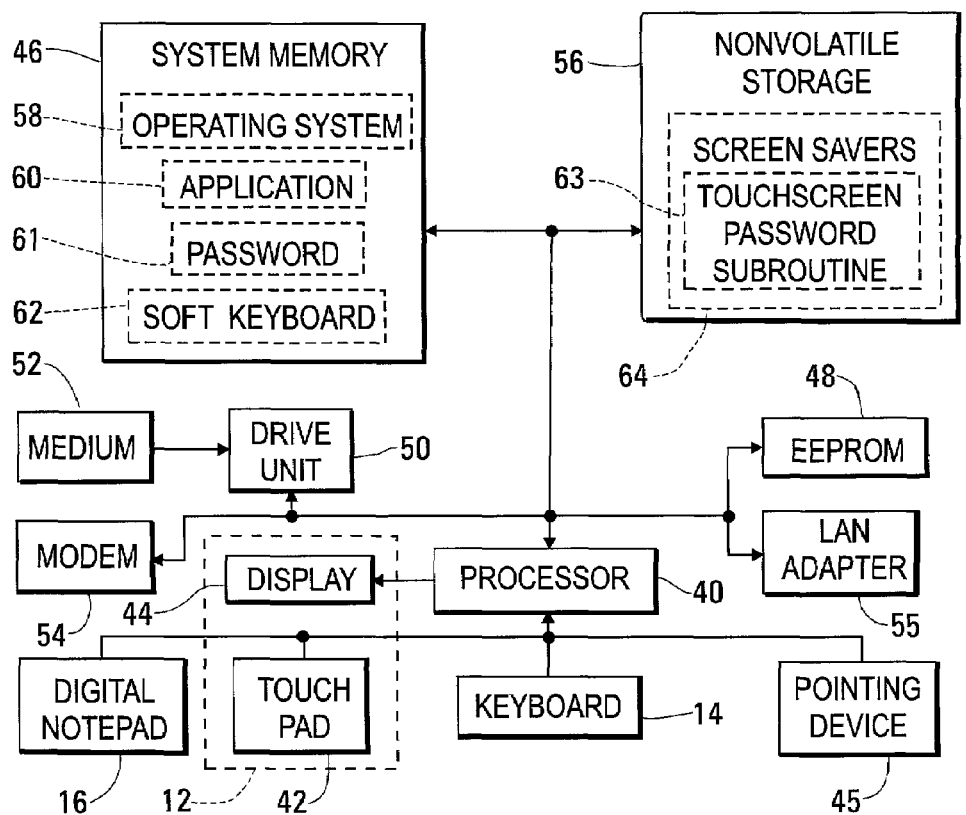
FIG. 4 is a block diagram showing major subsystems within the computing system of FIG. 1.

FIG. 4 is a block diagram of the computer system 10. A processor 40 receives user inputs from the keyboard 14, from the digital notepad 16, and from a touch pad 42 underlying a liquid crystal display 44 within the display screen 12. User inputs may also be provided through a pointing device 45, such as a mouse (not shown) plugged into the system 10 or the IBM TRACKPOINT pointing device having a control tip 48 (shown in FIG. 1) exposed within the keyboard 14. The system 10 also includes a random-access system memory 46, an EEPROM 48, a drive unit 50 for reading data recorded on a removable computer readable medium 52. The system 10 may also include a modem 54 for making wired or wireless connections with the public switched telephone network and/or a LAN adapter 55 for making connections with a LAN (local area network). The computer readable medium 52 may be a compact, optically-readable disk or a floppy, magnetically-readable disk. Separate drive units may be provided for reading different types of computer readable media, and such separate drive units may be external devices plugged into the system 10. The computing system 10 additionally includes non-volatile storage 56, in form of a hard disk drive or a flash memory, each of which includes a computer readable medium, held within the system 10, which retains recorded data even when electrical power within the system 10 is turned off.

The processor 40 executes instructions of an operating system 58 and an application program 60 stored within system memory 46. Both the operating system 58 and the application program 60 may be stored in one or more computer readable media 52 to be read in the drive unit 50 and then stored in the non-volatile storage 46. Alternatively, either or both the operating system 58 and the application program 60 may be transmitted in the form of electrical signals over a telephone network and through the modem 54, or over a LAN and through the LAN adapter 55, being downloaded for storage in the non-volatile storage 56.

In accordance with the present invention, one or more password routines 61 executing in the processor 40 provide for one or more types of instances in which a password is required, and a soft keyboard subroutine 62, also being executed from the system memory 46, causes the keyboard graphic 36 (shown in FIG. 3) to be presented. When this screen is presented, output signals from the touch pad 42 are interpreted to represent specific keyboard key strokes, for example in the manner generally as described in U.S. Pat. Nos. 5,784,060 and 5,805,157.

Specifically, referring to FIGS. 3 and 4, the keyboard graphic 36 includes a number of spaces 62a defined by a pattern of lines 62b, with each of the spaces including either an alphanumeric character or a symbolic representation of a function to be performed by the computing system 10, such as "Enter" for the entry of data. The touch pad 42 produces an electrical signal representing a position in which the display screen 12 is touched. This electrical signal is processed and provided as an input to the processor 40. When the keyboard graphic 36 is displayed, the soft keyboard subroutine 62 causes the electrical signal from the touch pad 42, resulting from touching the display screen 12 in one of the spaces 62a, to be interpreted within the computing system 10 as a code representing the alphanumeric character shown within the space 62a or the function graphically represented within the space 62a.

Thus, the can enter a password by touching the appropriate spaces 62a with his finger, or, for example, with the rounded end 62c of the special pen 18, (shown in FIG. 1). The spaces 62a including alphanumeric characters are used to enter the individual alphanumeric characters of the password, while at least some of the functions graphically represented within the keyboard graphic 36 may also be used. For example, the data entry function, represented by "Enter" may be used to enter data which has been provided through the soft keyboard. The capitalization function, represented by "Caps" may be used to change the case of alphabetic symbols in a case-sensitive password, and the backspace function, represented by "Back" may be used to prepare for entering over an erroneously entered alphanumeric character.

Before the operating system 58 is loaded from nonvolatile storage 56, an initialization program stored in the EEPROM 48 and executing within the processor 40 may require that a password by entered by the user. Then, the operating system may require an operating system password before proceeding to run an application program. A network password may also be required before the user is allowed to log on to a network. In general, the user is allowed to set the individual passwords and to determine, during a set up process, whether password protection will be used. Thus, the dialog box 32 and keyboard graphic 36 are displayed for use in entering a password when a predetermined point is reached within the execution of a subroutine in the processor 40, and when it is further determined that the use of a password at the predetermined point has been previously selected.

In accordance with a preferred version of the present invention, the application program 60 is executed to load the touchscreen password subroutine 63 into storage within a folder 64 in nonvolatile storage 56, with the folder 64 being otherwise used for the storage of one or more conventional screen saver subroutines. In this way, the touchscreen password subroutine is made available for selection by the user as a screen saver. After such a selection is made, the touchscreen password subroutine is executed in response to a call issued by the operating system for a screen saver subroutine. A conventional screen saver subroutine provides a number of patterns of moving images on the display screen when the system has apparently been left unattended for a predetermined period of time, as evidenced by a lack of inputs from the system user through a keyboard or pointing device. A password function associated with a conventional screen saver subroutine prevents operation of the computing system under the control of a user until he has correctly entered a predetermined screen saver password. Since examples of an operating system suitable for this type of operation are found in the Microsoft operating systems sold as Windows 95, Windows 98, Windows ME, and Windows 2000, the following description assumes the use of one of these operating systems, hereinafter called "WINDOWS."

WINDOWS conventionally provides for the execution of subroutines causing various different series of screen saver images to be displayed during performance of the screen saver function, with such subroutines being stored in a folder 64 in nonvolatile storage 56. The folder 64 has the address C:\WINDOWS\SYSTEM, and such subroutines are stored with the file extension .SCR. WINDOWS provides a dialog box, which is accessed by selecting a Screen Saver tab on the Display Properties Panel from the Control Panel, on which the user can determine the screen saver subroutine to be used from a list of stored screen saver subroutines. For example, the touchscreen password subroutine 63 is stored as a screen saver subroutine named "IBM TouchBoard Screen Saver." After this name is selected from a list of names in the dialog box, the screen shown in FIG. 3 is presented whenever WINDOWS determines that a sufficient period of inactivity, without a user input to the system 10, has occurred.

WINDOWS also provides for user to determine a sequence of alphanumeric symbols to be used as a password. The dialog box accessed by selecting the Screen Saver also includes a check box for indicating if the screen saver is to be password protected. When this check box is selected, a Change button is made available. After this button is selected, the password is typed and retyped for confirmation.

Figure 5:
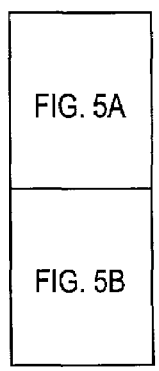
FIG. 5 is a flow chart of processes occurring in accordance with the preferred version of the present invention within the computing system of FIG. 1, with FIG. 5A being an upper portion of FIG. 5, and FIG. 5B being a lower portion thereof.
Figure 5A:
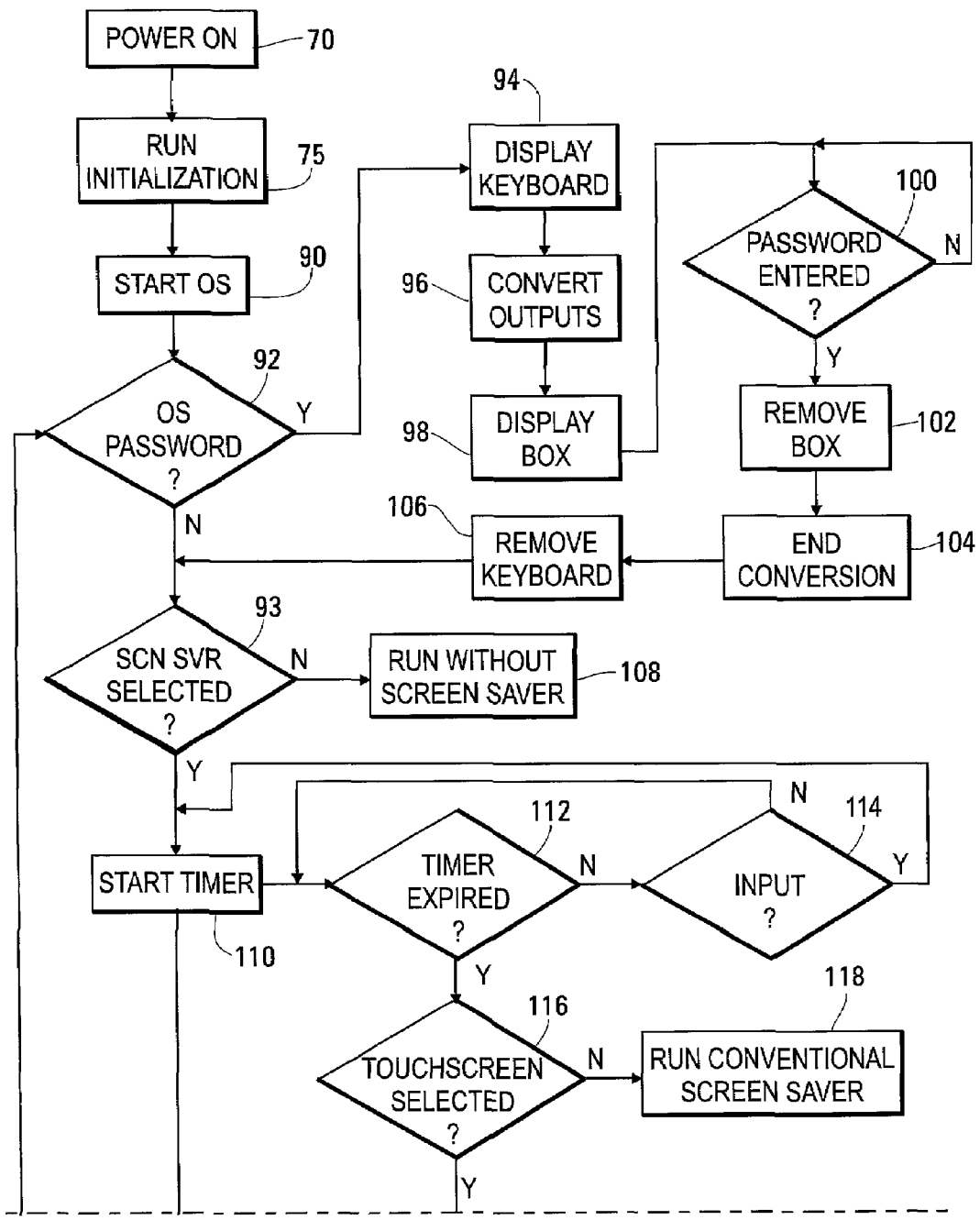
Figure 5B:
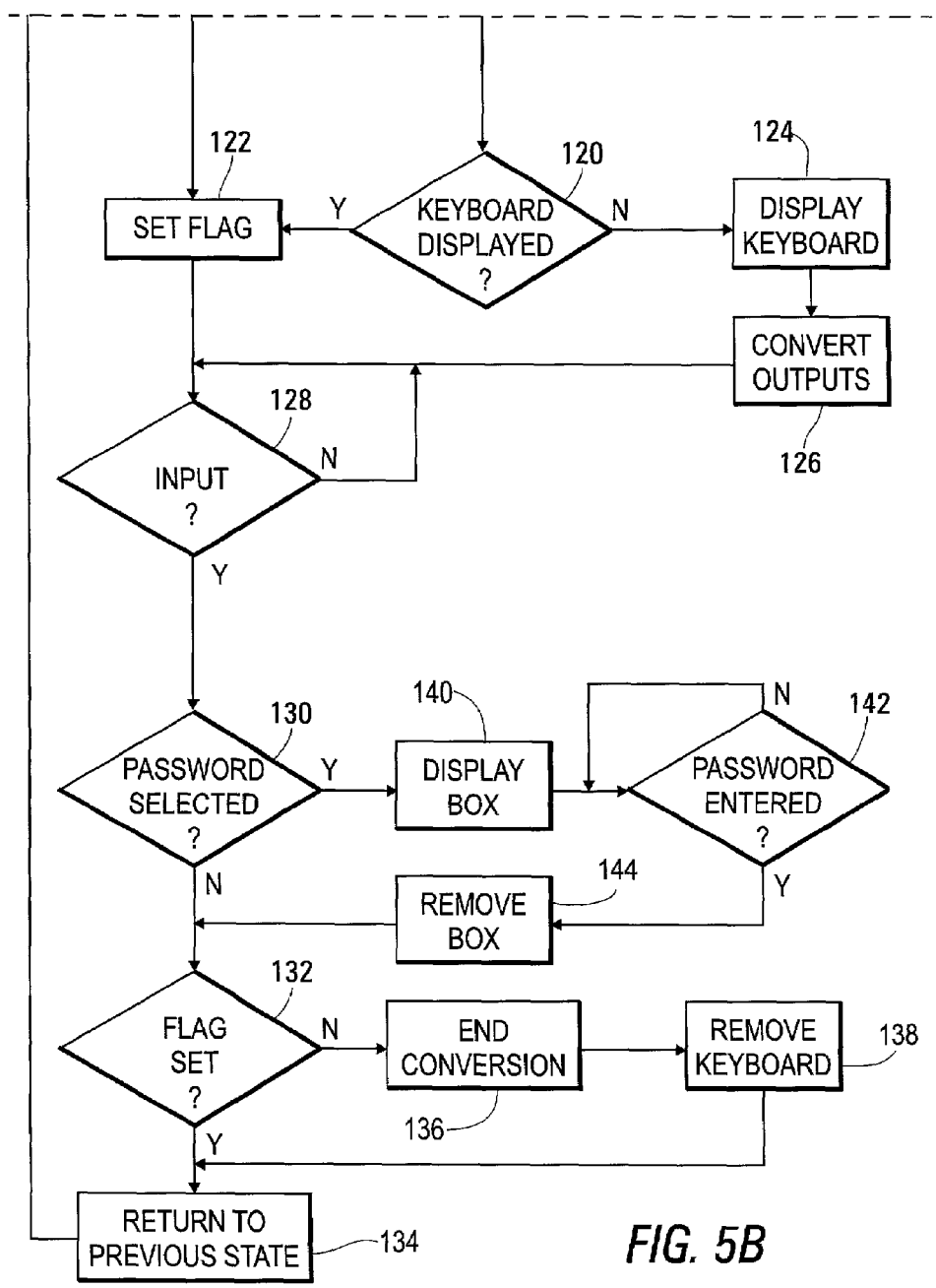

FIG. 5 is a flowchart of processes occurring in accordance with the preferred version of the present invention after the application program 60 has been used, in a previous operating session, to store the touchscreen password subroutine 63. Also, in a previous operating session, the user has preferably been given an opportunity in a previous session to determine whether a power-on password, an operating system password, such as a WINDOWS password, and a screen saver password should be required, and to provide the passwords to be used for these purposes if they are required. The user has preferably also been given an opportunity to determine the time which should be allowed to elapse without a user input before a screen saver is started. The processes of FIG. 5 occur as a result of the execution of instructions within an initialization program, such as BIOS (basic input/output system) routine stored within the EEPROM 48, as a result of the execution of instructions within the operating system 58, such as WINDOWS, as a result of the execution of instructions within the password subroutine 61, as a result of the execution of instructions within the soft keyboard subroutine 62, and as a result of the execution of instructions within the touchscreen password subroutine 63. FIG. 5A shows an upper portion of the flowchart of FIG. 5, while FIG. 5B shows a lower portion thereof.

The processes of FIG. 5 begin in step 70, with electrical power being turned on in the computing system 10. Next, in step 75, the initialization program is run. After this initialization process has been completed, the operating system 58 is loaded from nonvolatile storage 56 to system memory 46 and started in step 90. Then, in step 92, a determination is made of whether an operating system password is required. If it is not required, the operating system continues to step 93, in which a determination is made of whether a screen saver has been selected. Otherwise, the soft keyboard subroutine is called by the initialization program to display the keyboard configuration 36 in step 94 and to cause outputs of the touch pad 42 to be converted to codes representing the characters of the keyboard configuration 36 in step 96. In step 98, the operating system displays a dialog box 32 requesting the password. Then, if the password is entered correctly, as determined in step 100, the dialog box 32 is removed in step 102, the conversion of codes begun in step 96 is terminated in step 104, and the keyboard configuration 36 is removed in step 106. Then, the operating system continues to step 93.

If it is determined in step 93 that a screen saver has not been selected, the system continues to run in step 108, under control of the operating system, the user, and other routines and applications which may be loaded. Otherwise, a timer subroutine is started in step 110. Until the timer expires, as determined in step 112, the timer is restarted in step 110 following each input by the user, as determined in step 114. The time previously specified by the user to wait before starting a screen saver is used to determine the elapsed time at which the timer expires. When the timer expires, the system proceeds from step 112 to step 116, in which a determination is made of whether the touchscreen screen saver has been previously selected. If it has not, the operating system 58 continues to run in step 118, providing a selected screen saver from the conventional screen saver routines stored in folder 64.

On the other hand, if the touchscreen screen saver has been selected, the system proceeds to step 120, in which it is determined whether the keyboard is displayed. If it is displayed at this time, it must be present as a result of a program executing within the computer system 10, or as a result of a decision by the system user to use the keyboard before the system 10 was left without a user input long enough to allow the expiration of the timer. A preferred version of the present invention requires that, upon the successful entry of the password, the system is to be restored to its operating condition before the timer expired to initiate this process; if the keyboard graphic 36 is present in step 120, it must be retained following successful entry of the password; and, if the keyboard graphic 36 is not present in step 120, it must be removed from the display screen 12 upon successful entry of the password. To make this possible, only if the keyboard graphic is present in step 120, a flag is set in step 122. If the keyboard graphic 36 is not displayed in step 120, the soft keyboard subroutine is called by the touchscreen password subroutine 63 to display the keyboard graphic 36 on the screen 12 in step 124, and, in step 126, to cause outputs of the touch pad 42 to be converted to codes representing the characters and functions of the keyboard configuration 36.

After steps 122 and 126, the system waits to recognize a user input in step 128. Steps 114 and 128 are each steps in which a user input is used to determine that the system is attended. In step 122, before the timer has expired, this fact is used to reset the timer. The input may be made through the keyboard 14, through the touch pad 42 of the display screen 12, through the digital notepad 15, or through an attached pointing device 45. In each case, an electrical signal is generated as a result of an operator action is recognized as the input.

After such an input is recognized in step 128, the system proceeds to step 130 to determine whether, in a previous session, the user has selected a password for this situation. If he has not, the system proceeds to step 132, in which it is determined whether the flag has previously been set in step 122. If it has been set, it is known that the keyboard graphic 36 was previously visible, so the keyboard graphic 36 continues to be displayed as the system returns to its previous state in step 134. If the flag has not been set, the process of conversion of output signals from the touch pad 42, which has been started in step 126, is ended in step 136, and the keyboard graphic 36 is removed from the display screen 12. Thus, if a password has not been previously selected for this use, the system is returned to its previous state following the detection of a user input in step 128.

On the other hand, if it is determined in step 130 that the user has previously selected a password for this purpose, the system proceeds to step 132, in which the dialog box 32 is presented, providing an indication that the password should be entered. If the password is then entered correctly, as determined in step 142, the system causes the dialog box 32 to be removed from the display screen 12 in step 144. Then the system proceeds to step 132, so that the system is returned to its previous state in step 134, with or without continued display of the keyboard graphic 36, as determined by whether the flag has been set.

The password is preferably composed of alphanumeric characters previously submitted by the user, who determines its length. Therefore, the "enter" function is used to indicate that all of the characters have been entered. Alternately, all allowable passwords may be the same length, with the data being automatically entered when the correct number of characters have been selected. Otherwise, the password may be recognized when it is completely entered, so that the use of the "enter" function is unnecessary.

TABLE 1 is a listing of source code used to write the main function and startup code of the application program 60. This listing is written to interface with the WINDOWS (Microsoft® Win 32®) application programming interface (API) supporting screen saver applications, with portions of the listing being written as described in an Internet document "Handling Screen Savers," which is incorporated herein by reference, available at:

http://msdn.microsoft.com/library/psdk/shellcc/shell/ScrnSave.html

TABLE 1

```
#include <windows.h>    //Always required for Windows applications
#include <stdlib.h>
#include <scrnsave.h>
#include "resource.h"#include <stdio.h>
#define TOUCHBOARD_CLASS    TEXT("IBM TouchBoard")
static BOOL AppStarted, AppWasVisible;  //If & Who started
                                        //Touch Board Flags
AppStarted = FALSE;          //initialize to FALSE
AppWasVisible = FALSE;       //initialize to FALSE
HANDLE hInst;                //current instance
UINT wTimer = 0;             // Timer id
HWND hProcWnd;               //Handle to TouchBoard Window
int rc;                      //Return value
/*
* RegisterDialogClasses -- Entry point for registering window
*classes required by configuration dialog box.
*/
BOOL WINAPI RegisterDialogClasses(HINSTANCE hInst)
{
    return 1;
}
/*
* ScreenSaverConfigureDialog -- Process the screen saver
* configuration messages for the config dialog
*/
BOOL CALLBACK ScreenSaverConfigureDialog(HWND hWnd,
UINT Msg, WPARAM wParam, LPARAM lParam)
{
    switch(Msg)
    {
        case WM_COMMAND:
                switch(LOWORD(wParam))
                {
                    case IDOK:                   //Exit the dialog
                    case IDC_EXIT:
                        EndDialog(hWnd, 42);     //End the Dialog
                        break;
                }
                break;
        default:
                return FALSE;
                break;
    }
    return TRUE;
}
```

In the main function listing of TABLE 1, standard files required for WINDOWS applications are included, the window class for this application is defined as TOUCHBOARD_CLASS, the name of the screen saver is defined as "IBM Touchboard," and AppStarted and AppWasVisible flags are defined. Since the soft keyboard subroutine 62 displaying the keyboard graphic 36 FIG. 3 may be started either by this screen saver subroutine being stored in the screen savers folder 64 or by another means, the AppStarted and AppWasVisible flags are used to determine whether the keyboard graphic 36 is visible when the touchscreen password subroutine 63 is started, and whether it has been made visible by another means. Since the keyboard graphic 36 can be used for may purposes to provide user data inputs, this graphic 36 may have been made visible, before the initiation of the touchscreen password subroutine 63, in response to a call from another subroutine executing within the processor 40, or in response to a user input. When a password has been successfully entered following a period of inactivity, it is desirable for a computer system to be returned to the state in which it was operating before the period of inactivity. Thus, if the keyboard graphic 36 was visible before initiation of the touchscreen password subroutine 63, as indicated by a TRUE value of the variable AppWasVisible, it is retained in place on the display screen 12, without forming a second instance of the keyboard graphic 36, and it is further retained after the password has been successfully entered. On the other hand, if the keyboard graphic 36 was not visible before initiation of the touchscreen password subroutine 63, as indicated by a FALSE value of the variable AppWasVisible, a new instance of the keyboard graphic 36 is started, but this keyboard graphic 36 is removed from the display screen 12 following the successful entry of the password. In the main function, AppStarted and AppWasVisible are initialized as FALSE.

The ScreenSaverConfigureDialog function in the listing of TABLE 1, which is required by WINDOWS, displays a screen saver configuration dialog box, which enables the user to configure the screen saver. The RegisterDialogClasses function is required by WINDOWS to be called by all screen saver applications. However, applications, such as the touchscreen password subroutine 63, which do not require special windows or custom controls in the screen saver configuration dialog box, can simply return TRUE for this function, as implemented in the listing of TABLE 1 by setting a value of 1.

Thus, the touchscreen password subroutine 63 is chosen for operation as a screen saver by the user, through the screen saver configuration dialog box, which is conventionally presented by WINDOWS after the user selects first the WINDOWS Control Panel, then the Display option of the Control Panel, and then the Screen Saver tab of the dialog box shown in response to choosing the Display option. The screen saver configuration dialog box includes a drop-down list box, generally displaying a name of a screen saver and a drop down arrow. Clicking the arrow causes a list of available screen savers to be displayed. In accordance with a preferred version of the present invention, the name "IBM Touchboard Saver" is one of these. Choosing this name causes the touchscreen password subroutine 63 to be used when WINDOWS determines that a screen saver should be displayed. Before the password protection feature associated with the touchscreen password subroutine can be used, the user must also enable this feature by selecting a Password Protected checkbox also provided on the screen saver configuration dialog box.

TABLE 2 is a listing of source code to determine the operation of a ScreenSaverProc function, which is required by WINDOWS to process specific WINDOWS messages. This listing is also written in accordance with rules given in the Internet document "Handling Screen Savers," referenced above relative to TABLE 1. TABLE 2 is also written in accordance with a second Internet document "ScreenSaverProc, which is incorporated herein by reference, available at:

http://msdn.microsoft.com/library/shellcc/shell/functions/ScreenSaverProc.htm

TABLE 2

```
LONG CALLBACK ScreenSaverProc(HWND hWnd, UINT msg,
WPARAM wParam, LPARAM lParam)
{
    switch (msg) {
        case WM_CREATE:            //Nothing to do
        return 0;
        case WM_TIMER:             //Start SoftKeyboard
            hProcWnd = FindWindow(TOUCHBOARD_CLASS, NULL);
            if (!hProcWnd)         //If SoftKeyboard isn't running already
            {
                StartApp(AppStarted); //Use Function to start
                                    //TouchBoard using CreateProcess
                AppStarted = TRUE;
                hProcWnd = FindWindow(TOUCHBOARD_CLASS,
NULL);
            }
            else                   //SoftKeyboard already running
            {
                if(AppStarted == FALSE)    //Get initial App State
                    {
                        AppWasVisible = TRUE;    //Set flag
                    }
                    AppStarted = TRUE;
            }
            ShowWindow(hProcWnd, SW_SHOW);
            SetWindowPos(hProcWnd, NULL, 0, 0, 0, 0,
SWP_NOMOVE | SWP_NOSIZE | SWP_NOACTIVATE);
            EnableWindow(hProcWnd, TRUE);
            UpdateWindow(hProcWnd);
        return 0;
        case WM_ERASEBKGND: //Seed the random number
                                    //generator
            srand(GetTickCount());   //Tell windows to send us timer
                                    //messages at 50 ms intervals
            wTimer = SetTimer(hWnd, 0, 50, NULL);
            //Update Screen for EraseBackGround Event
            hProcWnd = FindWindow(TOUCHBOARD_CLASS,
NULL);
            if (hProcWnd)
            {
                ShowWindow(hProcWnd, SW_SHOW);
                SetWindowPos(hProcWnd, NULL, 0, 0, 0, 0,
SWP_NOMOVE
    | SWP_NOSIZE | SWP_NOACTIVATE);
                EnableWindow(hProcWnd, TRUE);
                UpdateWindow(hProcWnd);
            }
            break;
        case WM_LBUTTONDOWN:
        case WM_MOUSEMOVE:
            hProcWnd = FindWindow(TOUCHBOARD_CLASS,
NULL);
            if (hProcWnd)
            {
                ShowWindow(hProcWnd, SW_SHOW);
                SetWindowPos(hProcWnd, NULL, 0, 0, 0, 0,
SWP_NOMOVE
    | SWP_NOSIZE | SWP_NOACTIVATE);
                EnableWindow(hProcWnd, TRUE);
                UpdateWindow(hProcWnd);
            }
            break; //return 0;
        case WM_DESTROY:
/* message: window being destroyed */
            if (wTimer)          // Stop our timer if it was created
                KillTimer(hWnd, wTimer);
                    if (AppWasVisible == FALSE)//Close
                                    //TouchBoard if we started
                    {
                        SendMessage(hProcWnd,
WM_CLOSE, 0, 0);            //Close TouchBoard
                    }
            break;
    }
    return DefScreenSaverProc(hWnd, msg, wParam, lParam);
}
```

Figure 6:
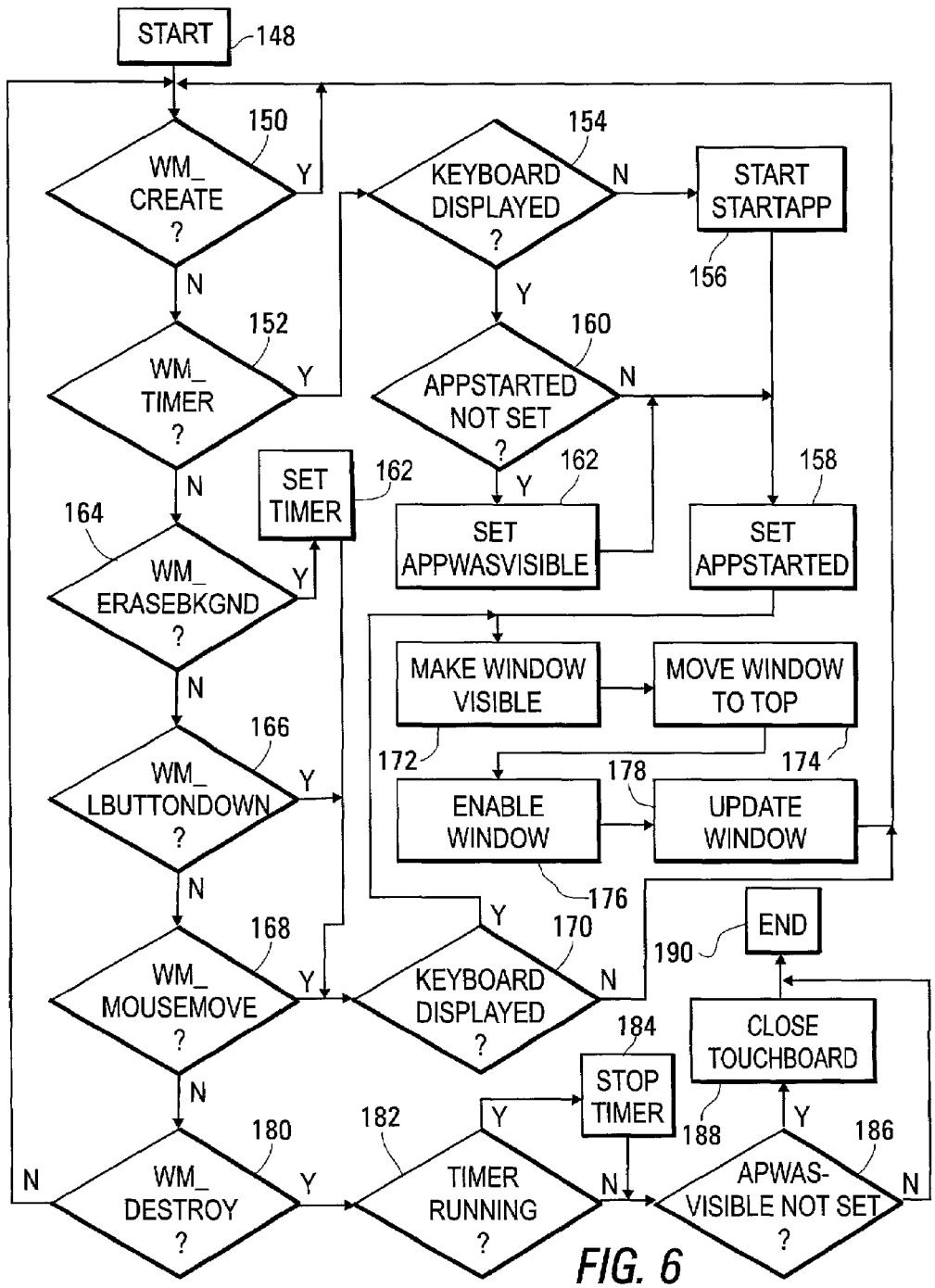
FIG. 6 is a flow chart of processes occurring within the computer system of FIG. 1 to handle messages from an operating system occurring as a result of the execution of the touchscreen password subroutine of FIG. 4.

FIG. 6 is a flow chart of processes occurring within the computer system 10 to handle messages from WINDOWS as a result of the execution of the touchscreen password subroutine 63. The parameters of the ScreenSaverProc function, used to handle these messages, are defined as hWind, identifier of the window; message, message sent to the screen saver window; wParam, additional message-specific information, and lParam, also additional message-specific information.

One WINDOWS message handled by the ScreenSaverProc function is WM_CREATE. This message is intended to allow a conventional screen saver subroutine to retrieve any initialization data from the Regedit.ini file, to set a window timer for the screen saver window, and to perform any other required initialization. However, which the touchscreen password subroutine 63 does not require this initialization process, this message is not used. Therefore, when a determination is made in step 150 that the WM_CREATE message has been received, nothing is done except to return a value of zero.

Another WINDOWS message handled by the ScreenSaverProc function is WM_TIMER. This message is intended to allow a conventional screen saver subroutine to perform the drawing operations needed to generate the screen saver image. According to the present invention, this message is used to start the display of the keyboard graphic 36. However, when this message is received, the keyboard graphic 36 may already be displayed, either as a result of the operation of another program, as a result of a user determination to display and use the keyboard graphic 36, or because the touchscreen password subroutine itself has already started displaying the keyboard graphic 36. Regardless of the reason why the keyboard graphic 36 is displayed, a second instance of the keyboard graphic 36 is not created at this point. Thus, when the WM_TIMER is received, as determined in step 152, a determination is made in step 154 of whether the keyboard is displayed. This determination is based on examining the variable !hProcWnd to determine if a handle to the touchboard keyboard can be found. This handle is present if the soft keyboard routine 62 has already started displaying the keyboard graphic 36. If this has not occurred, the soft keyboard subroutine 62 is called with StartApp in step 156, and the AppStarted flag is set to TRUE in step 158. On the other hand, if !hProcWnd indicates that the soft keyboard routine 62 has already started displaying the keyboard graphic 36, a determination is made in step 160 of whether the AppStarted flag has been set. Since the AppStarted flag is only sent in step 158, if this flag is found to be set, it is known that the keyboard graphic 36 is being displayed because the touchboard password subroutine 63 has already started. If this flag is found not to be set with the keyboard graphic 36 being displayed, it is known that the display of the keyboard graphic is due to another program or a previous user action, so the AppWasVisible flag is set in step 162.

Another WINDOWS message handled by the ScreenSaverProc function is WM_ERASEBKGND. This message is intended to allow a conventional screen saver subroutine to erase the screen saver window in preparation for subsequent drawing operations. When this message is received, as determined in step 164, WINDOWS is told in step 162 to provide timer messages at 50 ms intervals. Other WINDOWS messages handled by the ScreenSaverProc function are WM_LBUTTONDOWN and WM_MOUSEMOVE. These messages are generated by WINDOWS when the left button of a conventional mouse is depressed and when a conventional mouse is moved, respectively. In the computing system 10, a driver module provides for these inputs to also be provided through the touch pad 42 of the touch-sensitive display screen 12. When this screen 12 is touched at one point, the WM_LBUTTONDOWN message is generated. When the screen 12 is touched by a finger or stylus which is dragged along the screen, the WM_MOUSEMOVE message is generated. Since the WM_ERASEBKGND, WM_LBUTTONDOWN, and WM_MOUSEMOVE messages may be received either while the keyboard graphic 36 is displayed or when it is not displayed. Thus, after each of these messages is received, as determined in steps 164, 166, and 168, respectively, the variable !hProcWnd is examined in step 170 to determine if a handle to the touchboard keyboard can be found. This handle is present if the soft keyboard routine 62 has already started displaying the keyboard graphic 36. If this handle cannot be found, the system returns to step 150 to await another WINDOWS message.

If the keyboard is determined to be displayed in step 170, and additionally after step 158 following a determination that the WM_TIMER has been received, a function call is made in step 172 to make the keyboard graphic window visible, another function call is made in step 174 to move the keyboard graphic window to the "top," so that it is visible over any other window which may be displayed, a function call is made in step 176 to enable the keyboard graphic window to receive inputs, and yet another function call is made in step 178 to update the keyboard graphic window.

Another WINDOWS message handled by the ScreenSaverProc function is WM_DESTROY. This message is intended to allow a conventional screen saver subroutine to destroy the timer(s) created when the subroutine processed the WM_CREATE message and to perform any additional required cleanup. In the present invention, when this message is determined to have been received in step 180, a determination is made in step 182 of whether the timer is running. If it is, it is stopped in step 184. In either case, a determination is made in step 186 of whether the AppWasVisible flag has been set in step 162. If it has been set, it is known that the keyboard graphic 36 was visible before the operation of the touchscreen password subroutine 64, so the touchboard is not closed. Otherwise, the display of the keyboard graphic 64 is ended in step 188. In either case, the operation of the touchscreen password subroutine is ended in step 190.

The preferred version of the present invention provides an advantage of allowing the display and use of the keyboard graphic 36 to provide for entry of a screen saver password in the computing system 10 which is executing instructions from a standard WINDOWS subroutine providing a number of different screen saver images. If the keyboard graphic 36 is not presented by a subroutine operating as a screen saver subroutine, in the manner described above, the standard operating system overwrites the keyboard graphic 36 with a screen saver image, so that the keyboard graphic 36 cannot be seen or used.

While the present invention has been described in its preferred forms or embodiments with some degree of particularity, it is understood that this description has been given only by way of example, and that numerous changes in the arrangement of process steps can be made without departing from the spirit and scope of the invention.

We claim:

1. In a computer system having a user interface including a keyboard device for providing alphanumeric inputs and a touch-sensitive display screen, movable into a position covering said keyboard device, a method providing for entry of said password, said method comprising:

a) receiving a user input to said computer system b) resetting and starting a timer in response to step a);

c) determining that a predetermined time has elapsed since starting said timer;

d) determining whether a keyboard graphic is visible on said touch sensitive display screen;

e) in response to step c), and further in response to a determination in step d) that said keyboard graphic is not visible on said touch-sensitive display screen, displaying a keyboard graphic on said touch-sensitive display screen, wherein said keyboard graphic includes a first plurality of spaces, wherein each space in said plurality of spaces is defined by surrounding lines within said keyboard graphic, and wherein each space in said first plurality of spaces includes a symbol representing an alphanumeric character within said keyboard graphic;

f) in response to receiving output signals from said touch-sensitive display screen within a space in said plurality of spaces, producing a code representing said alphanumeric character represented by said symbol included within said space;

g) in response to receiving output signals from said keyboard device, converting said output signals from said keyboard device into a code representing an alphanumeric character;

h) sequentially receiving said codes representing alphanumeric characters;

i) determining that said alphanumeric characters represented by said codes sequentially received in step e) form a predetermined password; and j) in response to step i), and further in response to a determination in step c) that said keyboard graphic was not visible on said touch-sensitive display screen, removing said keyboard graphic from said touch-sensitive display screen.

2. The method of claim 1, wherein said keyboard graphic additionally includes a second plurality of spaces, each space in said second plurality of spaces is defined by surrounding lines within said keyboard graphic, each space in said second plurality of spaces includes a graphical representation of a function performed within said computer system, said method additionally comprises, following step b) converting output signals from said touch-sensitive display screen within a space in said second plurality of spaces to produce a code representing said function represented by said graphical representation included within said space, and, between steps f) and h), receiving a code representing a data entry function.

3. The method of claim 1, additionally comprising:

following step c), receiving an electrical signal resulting from a user input;

in response to receiving said electrical signal resulting from said user input, displaying an indication on said touch-sensitive display screen indicating a need to supply a password; and in response to step h) removing said indication from said touch-sensitive display screen.

4. The method of claim 1, wherein said method additionally comprises determining that a selection has been made to require entry of a password after said predetermined time has expired; and step e) occurs additionally in response to determining that said selection has been made.

* * * * *